United States Patent [19]

Fukui

[11] 4,239,871

[45] Dec. 16, 1980

[54] PROCESS FOR POLYMERIZATION OF BUTENE

[75] Inventor: Kunisuke Fukui, Ohtake, Japan

[73] Assignee: Mitsui Petrochemical Industries Ltd., Tokyo, Japan

[21] Appl. No.: 96,420

[22] Filed: Nov. 21, 1979

[30] Foreign Application Priority Data

Nov. 28, 1978 [JP] Japan .................................. 53/146045

[51] Int. Cl.$^3$ ........................ C08F 2/14; C08F 110/08
[52] U.S. Cl. .................................... 526/73; 526/348.2; 526/348.3; 526/348.5; 526/348.6; 526/922
[58] Field of Search .................................. 526/73, 922

[56] References Cited

FOREIGN PATENT DOCUMENTS 50-8758 12/1975 Japan .
940145 10/1963 United Kingdom .

*Primary Examiner*—Stanford M. Levin
*Attorney, Agent, or Firm*—Sherman & Shalloway

[57] ABSTRACT

A process for the polymerization of butene-1 in a liquid aliphatic hydrocarbon medium in the presence of a catalyst composed of a titanium trihalide and an organo-aluminum compound which comprises initially polymerizing a minor part of the butene-1 at a temperature within a range sufficiently low that a slurry of polymer in said medium is produced and then increasing the temperature of polymerization so that the greater part of the butene-1 is polymerized within a high temperature range higher than that of the initial polymerization but not at a temperature so high that the polymer formed dissolves in said medium, characterized in that (1) the initial polymerization is carried out at a temperature of not more than 20° C. in the presence of said titanium trihalide in an amount of not less than 50 millimoles and up to 1,000 millimoles per liter of said medium, and then (2) the polymerization is carried out in the presence or absence of said medium at a temperature of 25° C. to less than 48° C. in the presence of said titanium trihalide in an amount up to one-fifth of that of the initial polymerization.

3 Claims, No Drawings

PROCESS FOR POLYMERIZATION OF BUTENE

This invention relates to an improved process for producing crystalline polybutene-1 having a high bulk density with a good reproducibility of quality.

Specifically, this invention provides, in a process for the polymerization of butene-1 in a liquid aliphatic hydrocarbon medium in the presence of a catalyst composed of a titanium trihalide and an organoaluminum compound which comprises initially polymerizing a minor part of the butene-1 at a temperature within a range sufficiently low that a slurry of polymer in said medium is produced and then increasing the temperature of polymerization so that the greater part of the butene-1 is polymerized within a high temperature range higher than that of the initial polymerization but not at a temperature so high that the polymer formed dissolves in said medium, the improvement wherein (1) the initial polymerization is carried out at a temperature of not more than 20° C. in the presence of said titanium trihalide in an amount of not less than 50 millimoles and up to 1,000 millimoles per liter of said medium, and then (2) the polymerization is carried out in the presence or absence of said medium at a temperature of 25° C. to less than 48° C. in the presence of said titanium trihalide in an amount up to one-fifth of that of the initial polymerization.

It has previously been known to produce polybutene-1 by polymerizing butene-1 in slurry in a liquid hydrocarbon medium in the presence of a catalyst composed of a titanium trihalide and an organoaluminum compound. Because polybutene-1 formed by this process is susceptible to swelling with the hydrocarbon medium, a polymer gel results frequently to make the polymerization operation difficult.

In an attempt to avoid this trouble, British Pat. No. 940,145 (published on Oct. 23, 1963) suggested a process for the polymerization of alpha-olefins including butene-1 in a liquid aliphatic hydrocarbon medium in the presence of a catalyst composed of a titanium trihalide and an organoaluminum compound, wherein initially a minor part of the alpha-olefin is polymerized at a temperature within a range sufficiently low that a slurry of polymer in the medium is produced and then the temperature of polymerization is increased so that the greater part of the alpha-olefin is polymerized within a high range of temperature higher than that of the initial polymerization but not at a temperature so high that the polymer formed dissolves in said medium.

The British patent states that polymerization of, for example, butene-1 in petrol ether at temperatures between 30° C. and 60° C. gives an intractable jelly-like mass. It is stated that at lower temperatures of, say, 20° C., a slurry can be formed, but the rate of reaction is slow and the melt viscosity of he polymer obtained is so high as to be unacceptable for many commercial purposes. The British patent thus teaches that by using a mixture of paraffins, boiling in the range of 180° to 220° C., free from aromatic and hydroxylic compounds, handleable slurries can be obtained at a temperature of 30° to 35° C., but above 35° C., the slurries are swollen. The British patent also teaches that when butene-1 itself is used as a reaction medium, handleable slurries are obtained at 40° to 46° C., but at 50° C., a swollen polymer results.

With this background, the British patent suggests that initial polymerization for the production of about 2 g of polybutene-1 per millimole of titanium be carried out at a temperature of 30° to 37° C. using a solvent consisting of a mixture of paraffins, boiling in the range of 180° to 220° C., free from aromatic and hydroxylic compounds marketed under the tradename "Sinarol," and then the polymerization be carried out at a temperature of not less than 48° C., preferably above 48° C., but not so high that the butene-1 polymer dissolves in the liquid solvent. In an example of polymerizing butene-1, the British patent discloses the use of polymerization temperatures of 50° to 55° C. Further, the British patent is silent on the bulk density of the resulting polymer.

Japanese patent publication No. 8758/75 (published on April 7, 1975) discloses a process in which initial polymerization of butene-1 is carried out at not more than 50° C., preferably 40° to 50° C., so that an amount of the butene-1 is polymerized which accounts for 5 to 15% of the final polymerization product of butene-1, and then the polymerization is further carried out at a temperature of 50° to 80° C. to form a final polymerization product. This Japanese patent publication touches upon the increase of bulk density, but does not show any specific working example of producing polybutene-1. It only discloses an example of polymerizing a 50:50 mixture of n-butane and butene-1, and no data about the bulk density of the final polymer is given.

We have studied the prior art methods for polymerizing butene-1 in two steps, and found that by these conventional methods, it is difficult to avoid completely the formation of a jelly-like mass and to produce a polymer having a sufficiently high bulk density as an easily handleable slurry, that the concentration of the polymer slurry cannot be made high, and that it is extremely difficult in practice to obtain an easily handleable polymer slurry having a high bulk density with a good reproducibility of quality.

We furthered our investigations in order to provide an improved process for producing polybutene-1 having a sufficiently high bulk density, which is completely free from the troubles in the prior art methods.

These investigations have led to the discovery that the selection of only the reaction medium and the temperature conditions in the initial polymerization step and the subsequent polymerization step for producing a final polymer is an unsatisfactory guideline, and a new set of parameters consisting of the polymerization temperatures and the amounts of the titanium trihalide in the two polymerization steps, and preferably the amount of the monomer polymerized in the initial polymerization step, are of utmost importance to the provision of the improved process intended by the present invention.

On further investigation based on this new discovery, we have found that by using low reaction temperatures avoided in the initial polymerization step in the prior art methods and lower reaction temperatures than about 50° C. recommended in the prior art methods in the further polymerization step in combination with the specific concentrations of the titanium trihalides in the two polymerization steps, the troubles in the prior art can be removed, and polybutene-1 having a high bulk density can be obtained in good yields as an easily handleable slurry of high concentration while completely inhibiting the formation of a jelly-like mass.

We have specifically found that the aforesaid improved process can be achieved without any troubles in the rate of reaction or in the melt viscosity of the final product by performing the polymerization of butene-1 under the following conditions:

(1) the initial polymerization is carried out at a temperature of not more than 20° (which temperature has previously been avoided because it is unacceptable in view of the low rate of reaction and the high melt viscosity) in the presence of the titanium trihalide in an amount of not less than 50 millimoles and up to 1,000 millimoles per liter of the medium, and then, (2) the polymerization is carried out in the presence or absence of the medium at a temperature of 25° C. to less than 48° C. (which temperature is lower than that suggested by the prior art) in the presence of the titanium trihalide in an amount of up to one-fifth of that of the initial polymerization step.

It has also been found that better results can be achieved by maintaining the amount of 1-butene polymerized in the initial polymerization relatively low, that is, by carrying out the initial polymerization so that the amount of polybutene-1 formed is not less than 0.1 g per millimole of titanium and up to 10% by weight of the final polymerization product of butene-1.

We have further found that much better results can be achieved by employing such conditions that the concentration of butene-1 in the initial polymerization is not over 500 millimoles per liter of the medium.

It is an object of this invention to provide an improved process for polymerizing butene-1 in slurry by a two-step procedure.

The above and other objects and advantages of this invention will become more apparent from the following description.

The catalyst used in this invention composed of a titanium trihalide and an organoaluminum compound is known, and any known catalyst ingredients can be properly selected in this invention.

One example of the titanium trihalide is a titanium trihalide of the general formula $TiX_3 \cdot nAlX_3$ in which X is halogen, and $0 \leq n \leq 0.5$. A typical example of the titanium trihalide of the above formula is titanium trichloride obtained by reducing titanium tetrachloride with a reducing agent such as hydrogen, aluminum, titanium or an organoaluminum compound. Titanium trichloride obtained by reducing titanium tetrachloride with an organoaluminum compound and optionally heat-treating the product is preferred.

Examples of the organoaluminum compound used as a reducing agent include triethyl aluminum, triisobutyl aluminum, diethyl aluminum chloride, ethyl aluminum sesquichloride and ethyl aluminum dichloride.

Compounds having a hydrocarbon radical directly bonded to an aluminum atom are used as the organoaluminum compound, another constituent ingredient of the catalyst used in this invention. Examples of such an organoaluminum compound include trialkyl aluminums, dialkyl aluminum halides, alkyl aluminum sesquihalides, alkyl aluminum dihalides, dialkyl aluminum alkoxides, dialkyl aluminum aryloxides, dialkyl aluminum hydrides, and alkyl aluminum compounds of a structure in which a plurality of aluminum atoms are connected through an oxygen or nitrogen atom. The alkyl moiety in the above-exemplified compounds preferably has 1 to 10 carbon atoms, and in the halogen-containing compounds, chlorine, bromine and iodine can be cited as examples of the halogen, chlorine being especially preferred.

Specific examples of the organoaluminum compound are trialkyl aluminums such as triethyl aluminum, triisobutyl aluminum, and trihexyl aluminum; dialkyl aluminum halides such as diethyl aluminum chloride and diisobutyl aluminum chloride; alkyl aluminum sesquichlorides such as ethyl aluminum sesquichloride and isobutyl aluminum sesquichloride; and alkyl aluminum dihalides such as ethyl aluminum dichloride and isobutyl aluminum dichloride. Of course, these compounds may be used as a mixture of two or more. Among these exemplified compounds, the dialkyl aluminum halides are particularly preferred.

During the polymerization, additives such as electron donors may be present in addition to the titanium trihalide and the organoaluminum compound in order to increase polymerization activity or stereoregularity. Suitable electron donors are, for example, organic acid esters, ethers, ketones and alcohols.

The initial polymerization in the process of this invention is carried out in a liquid aliphatic hydrocarbon medium. Suitable aliphatic hydrocarbon hydrocarbons having 5 to 20 carbon atoms, preferably 8 to 20 carbon atoms. Specific examples are pentane, hexane, heptane, octane, nonane, decane, dodecane octadecane and mixtures of at least two of these hydrocarbons.

The initial polymerization is carried out at a temperature of not more than 20° C., preferably about 5 to about 15° C. Temperatures exceeding 20° C. should be avoided in the initial polymerization step because in conjunction with the specified combination of conditions in this invention, such higher temperatures lead to low bulk densities.

In addition to the aforesaid temperature condition, the initial polymerization in the process of this invention is carried out in the presence of a titanium trihalide in an amount of not less than 50 millimoles and up to 1,000 millimoles per liter of the medium. The preferred amount of the organoaluminum compound selected in this step is such that the Al/Ti atomic ratio is from 0.1 to 100, especially from 1 to 10. When an electron donor is used together, the suitable amount of the electron donor is not more than 1 mole per mole of the organoaluminum compound.

Thus, the initial polymerization in the process of this invention should be carried out under a combination of the above-specified temperature condition and the above-specified condition for the concentration of the titanium trihalide.

Preferably, the initial polymerization is carried out so that the amount of polybutene-1 formed is not less than 0.1 g per millimole of titanium and up to 10% by weight of the final polymerization product of butene-1. For example, the amount of polybutene-1 formed may be as small as up to about 1 g per millimole of titanium.

When butene-1 is polymerized excessively rapidly in the initial polymerization to form the desired amount of polybutene-1, the bulk density of the polymer formed tends to decrease. Accordingly, it is desirable to supply 1-butene to the polymerization system incrementally or continuously in such a way that the concentration of the unreacted butene-1 is not more than 500 millimoles/liter, especially not more than 200 millimoles/liter.

After the initial polymerization, the polymerization is carried out to form the final polymerization product of butene-1.

The second-step polymerization is carried out at a temperature of 25° C. to less than 48° C., preferably 30° to 47° C., in the presence of a titanium trihalide in an amount up to one-fifth of that of the initial polymerization step. If temperatures of more than 48° C., for example 50° C. or more recommended in the prior art methods, are used under a combination of the aforesaid conditions in the second-step polymerization, an abrupt decrease in the bulk density of the resulting polymer is noted. At a polymerization temperature of less than 25° C., on the other hand, the rate of polymerization is slow, and the heat of reaction is not easy to remove, thus rendering the process commercially disadvantageous.

The polymerization in step (2) can be performed in the presence or absence of a liquid aliphatic hydrocarbon medium. This medium may be any of the same media as described hereinabove with regard to the initial polymerization step. When the hydrocarbon medium is not used, butene-1 itself may be used as a medium. In performing the polymerization in step (2), the suspension obtained in the initial polymerization may be diluted with the aliphatic hydrocarbon medium or butene-1, and the organoaluminum compound or an additive such as an electron donor may be freshly added to the suspension.

The polymerization in step (2) is carried out in the presence of a titanium trihalide in an amount up to one-fifth, preferably 1/1000 to 1/5, of that of the initial polymerization step.

The amount of the organoaluminum compound used in the second step is desirably such that the Al/Ti atomic ration is from 1 to 1,000. When an electron donor is used, its amount is desirably not more than 1 mole per mole of the organoaluminum compound.

In this polymerization, hydrogen may be caused to be present in order to control the molecular weight of the polymer. If desired, hydrogen may be present also in the initial polymerization step. Generally, however, there is no need for the presence of hydrogen in the initial polymerization because the concentration of 1 butene-1 is preferably low in the initial polymerization and therefore a polymer of a very high molecular weight is not likely to form. Rather, the presence of hydrogen in the initial polymerization step will lead to the formation of a prepolymer having a low molecular weight and, and therefore, result in a tendency toward the formation of a polymer having a decreased bulk density. Thus, the absence of hydrogen in the initial polymerization is preferred.

After the polymerization, the catalyst can be deactivated and removed by using generally known reagents such water, alcohols, ketones and carboxylic acids.

In the process of this invention, butene-1 may be copolymerized with not more than 10 mole%, preferably not more than 5 mole%, based on the resulting polymer, of another copolymerizable alpha-olefin such as ethylene, propylene, hexene-1, octene-1, decene-1, octadecene-1 and 4-methyl-pentene-1.

The following Examples and Comparative Examples illustrate the present invention more specifically.

EXAMPLE 1.

Preliminary polymerization (initial polymerization)

A 1-liter autoclave was charged with 400 ml of n-decane, 200 millimoles of diethyl aluminum chloride and 100 millimoles (250 millimoles/liter of medium) of titanium trichloride. While maintaining the temperature at 15° C., 30 g of butene-1 was introduced into the autoclave over the course of 180 minutes, and then reacted at 15° C. for 90 minutes. The amount of the butene-1 polymerized in this step was 0.3 g per millimole of titanium.

Main polymerization

A 2-liter autoclave was charged with 1 liter of n-decane and 10 millimoles (10 millimoles/liter of medium), calculated as titanium atom, of the catalyst suspension prepared in the preliminary polymerization. While maintaining the temperature at 45° C., 300 g of butene-1 was added over the course of 2 hours, and further polymerized at 45° C. for 5 hours. The unreacted butene-1 was removed, and the solid was collected by filtration. The catalyst was decomposed with methanol, and the mixture was washed and dried to form 252 g of polybutene-1 as a white powder having a bulk density of 0.34 g/ml.

EXAMPLES 2 TO 6

Pre-polymerization of butene-1 was carried out in the same way as in Example 1 except that the pre-polymerization temperature, the amount of butene-1 added and the time during which butene-1 was added were changed as shown in Table 1. Then, the main polymerization of butene-1 was performed in quite the same manner as in Example 1. The results are shown in Table 1.

TABLE 1

| Example | Pre-polymerization conditions | | | | Main polymerization condition | | Results of polymerization | |
|---|---|---|---|---|---|---|---|---|
| | Temperature (°C.) | Time for adding butene 1 (min.) | Amount of butene-1 polymerized (g/mM · Ti) | Amount of TiCl3 (mmoles/l) | Temperature (°C.) | Amount of TiCl3 (mmoles/l) | Amount of polymer yielded (g) | Bulk density (g/ml) |
| 2 | 10 | 180 | 0.3 | 250 | 45 | 10 | 250 | 0.39 |
| 3 | 5 | 180 | 0.3 | 250 | 45 | 10 | 260 | 0.44 |
| 4 | 10 | 30 | 0.3 | 250 | 45 | 10 | 257 | 0.35 |
| 5 | 15 | 180 | 0.15 | 250 | 45 | 10 | 254 | 0.38 |
| 6 | 15 | 180 | 0.6 | 250 | 45 | 10 | 256 | 0.39 |

COMPARATIVE EXAMPLE 1

Pre-polymerization of butene-1 was carried out in the same way as in Example 1 except that the temperature was changed to 25° C. Then, the main polymerization of butene-1 was carried out in quite the same way as in Example 1 to afford 247 g of polybutene-1 as a white powder having a bulk density of 0.27 g/ml.

The results show that the bulk density of the final polymer decreases with increasing temperature of the pre-polymerization.

COMPARATIVE EXAMPLE 2

A 2-liter autoclave was charged with 1 liter of n-decane, 20 millimoles of diethyl aluminum chloride and 10 millimoles of titanium trichloride. Then, 30 g of butene-1 was added at 15° C. and reacted for 120 minutes. Thus, 0.3 g of butene-1 was polymerized per millimole of titanium.

Subsequently, the polymerization system was heated to 45° C. over the course of 5 minutes. Then, 270 g of butene-1 was added over the course of 2 hours (the total amount of butene-1 added was 300 g), and polymerized at 45° C. for 5 hours. There was obtained 240 g of polybutene-1 as a white powder having a bulk density of 0.25 g/ml.

The results show that the bulk density of the final polymer decreases when the pre-polymerization and the main polymerization are carried out in the same catalyst concentration.

COMPARATIVE EXAMPLE 3

Pre-polymerization and main polymerization of butene-1 were carried out in the same way as in Example 1 except that the temperature in the main polymerization was changed to 50° C. There was obtained 263 g of polybutene-1 as a white powder having a bulk density of 0.21 g/ml.

The results show that the bulk density of the final polymer decreases when the temperature in the main polymerization is higher than the specified limit.

EXAMPLE 7

A 2-liter autoclave was charged with 1 liter of butene-1 and 3 millimoles, calculated as titanium atom, of the catalyst suspension prepared by the pre-polymerization in Example 1, and the polymerization was carried out at 35° C. for 1 hour. There was obtained 140 g of polybutene-1 as a white powder having a bulk density of 0.31 g/ml.

The results show that when butene-1 is used as a solvent, too, pre-polymerization in a high catalyst concentration leads to polybutene-1 having a high bulk density.

COMPARATIVE EXAMPLE 4

A 2-liter autoclave was charged with 1 liter of butene-1, 6 millimoles of diethyl aluminum chloride and 3 millimoles of titanium trichloride (3 millimoles/liter of medium), and the reaction was carried out at 10° C. for 30 minutes to polymerize 1 g of butene-1 per millimole of titanium. The polymerization system was then heated to 35° C. over the course of 5 minutes, and butene-1 was polymerized at 35° C. for 1 hour. There was obtained 162 g of polybutene-1 as a white powder having a bulk density of 0.20 g/ml.

COMPARATIVE EXAMPLE 5

A 2-liter autoclave was charged with 1 liter of n-decane, 74 millimoles of diethyl aluminum chloride and 37 millimoles of titanium trichloride (37 millimoles/liter of medium). At 20° C., 50 g of butene-1 was added, and reacted for 2 hours to polymerize 0.8 g of butene-1 per millimole of titanium. Subsequently, the polymerization system was heated to 45° C. over the course of 5 minutes. Butene-1 (250 g) was added over the course of 2 hours, and polymerized for another 2 hours to afford 280 g of polybutene-1 as a white powder having a bulk density of 0.26 g/ml.

What we claim is:

1. In a process for the polymerization of butene-1 in a liquid aliphatic hydrocarbon medium in the presence of a catalyst composed of a titanium trihalide and an organoaluminum compound which comprises initially polymerizing a minor part of the butene-1 at a temperature within a range sufficiently low that a slurry of polymer in said medium is produced and then increasing the temperature of polymerization so that the greater part of the butene-1 is polymerized within a high temperature range higher than that of the initial polymerization but not at a temperature so high that the polymer formed dissolves in said medium; the improvement wherein
    (1) the initial polymerization is carried out at a temperature of not more than 20° C. in the presence of said titanium trihalide in an amount of not less than 50 millimoles and up to 1,000 millimoles per liter of said medium, and then
    (2) the polymerization is carried out in the presence or absence of said medium at a temperature of 25° C. to less than 48° C. in the presence of said titanium trihalide in an amount up to one-fifth of that of the initial polymerization.

2. A process according to claim 1 wherein the initial polymerization is carried out so that the amount of polybutene-1 formed is not less than 0.1 g per millimole of titanium and up to 10% by weight of the final polymerization product of butene-1.

3. A process according to claim 1 wherein the concentration of butene-1 in the initial polymerization is not over 500 millimoles per liter of the medium.

* * * * *